United States Patent
Ditzler

(10) Patent No.: US 9,267,264 B2
(45) Date of Patent: Feb. 23, 2016

(54) BLADE PIVOT MECHANISM

(75) Inventor: Steven J. Ditzler, Bellevue, IA (US)

(73) Assignee: DEERE & COMPANY, Moline, IL (US)

( * ) Notice: Subject to any disclaimer, the term of this patent is extended or adjusted under 35 U.S.C. 154(b) by 238 days.

(21) Appl. No.: 13/100,848

(22) Filed: May 4, 2011

(65) Prior Publication Data

US 2012/0279735 A1 Nov. 8, 2012

(51) Int. Cl.
*E02F 3/76* (2006.01)
*E02F 3/815* (2006.01)
*E02F 9/00* (2006.01)
F16C 11/04 (2006.01)
F16C 11/06 (2006.01)

(52) U.S. Cl.
CPC .............. *E02F 3/815* (2013.01); *E02F 3/7613* (2013.01); *E02F 9/006* (2013.01); *F16C 11/045* (2013.01); *F16C 11/068* (2013.01); *F16C 11/0614* (2013.01); *Y10T 29/49826* (2015.01)

(58) Field of Classification Search
CPC .................................................... E02F 3/7613
USPC ....................... 172/820, 825, 701.1
See application file for complete search history.

(56) References Cited

U.S. PATENT DOCUMENTS

| | | | |
|---|---|---|---|
| 1,618,628 A | | 6/1923 | Baker et al. |
| 1,961,011 A | * | 5/1934 | Pearson ........................ 172/823 |
| 2,451,453 A | | 8/1944 | Tuxhom |
| 2,928,698 A | * | 3/1960 | Feighofen ..................... 384/206 |
| 3,234,670 A | * | 2/1966 | Fryer et al. ..................... 172/826 |
| 3,246,406 A | * | 4/1966 | Ray .................................. 172/822 |
| 3,315,356 A | | 4/1967 | Swanke et al. |
| 3,362,253 A | | 1/1968 | Ditlinger |
| 3,612,441 A | | 10/1971 | Abramopaulos |
| 3,631,931 A | * | 1/1972 | Frisbee ......................... 172/821 |
| 3,645,340 A | * | 2/1972 | Frisbee ......................... 172/812 |
| 3,648,782 A | * | 3/1972 | Mazzarins ..................... 172/821 |
| 3,757,647 A | | 9/1973 | Abramopaulos |
| 3,933,207 A | * | 1/1976 | Frisbee ......................... 172/824 |
| 3,955,458 A | | 5/1976 | Pearl |
| 3,974,882 A | * | 8/1976 | Eftefield ..................... 172/701.1 |
| 4,033,214 A | | 7/1977 | Pearl |
| 4,082,377 A | | 4/1978 | Saunders |
| 4,364,443 A | | 12/1982 | Sato et al. |
| 4,436,013 A | | 3/1984 | Gerber |
| 4,803,790 A | * | 2/1989 | Ciula ............................. 37/266 |
| 4,828,044 A | * | 5/1989 | Horsch et al. ................. 172/821 |
| 4,962,816 A | * | 10/1990 | Imon et al. ..................... 172/821 |
| 5,178,472 A | * | 1/1993 | Lawson ......................... 384/537 |
| 5,358,342 A | * | 10/1994 | Frisbee et al. ................. 384/213 |
| 2008/0184569 A1 | | 8/2008 | Moreno |
| 2010/0303547 A1 | | 12/2010 | Mathey |
| 2010/0308174 A1 | | 12/2010 | Calverly |

OTHER PUBLICATIONS

SKF spherical plain bearings and rod ends, http://www.skf.com/files/288839.pdf, Apr. 2004, SKF Group.

* cited by examiner

*Primary Examiner* — Thomas B Will
*Assistant Examiner* — Joel F. Mitchell

(57) ABSTRACT

A pivot mechanism for adjusting a blade on a work vehicle is provided. The pivot mechanism includes a bushing bolt fastened to a mounting bracket on the blade. The bushing bolt has a spherical portion fixedly positioned between coupling ends and configured to receive a bushing. The pivot mechanism further includes a cylinder coupled to the bushing bolt for controlling the position of the blade.

16 Claims, 6 Drawing Sheets

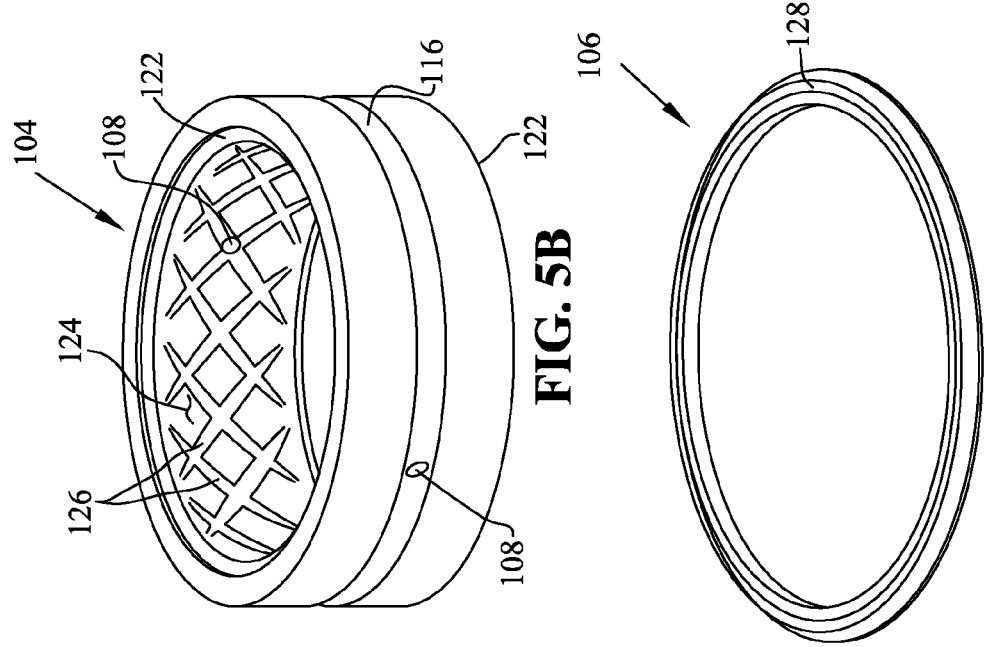
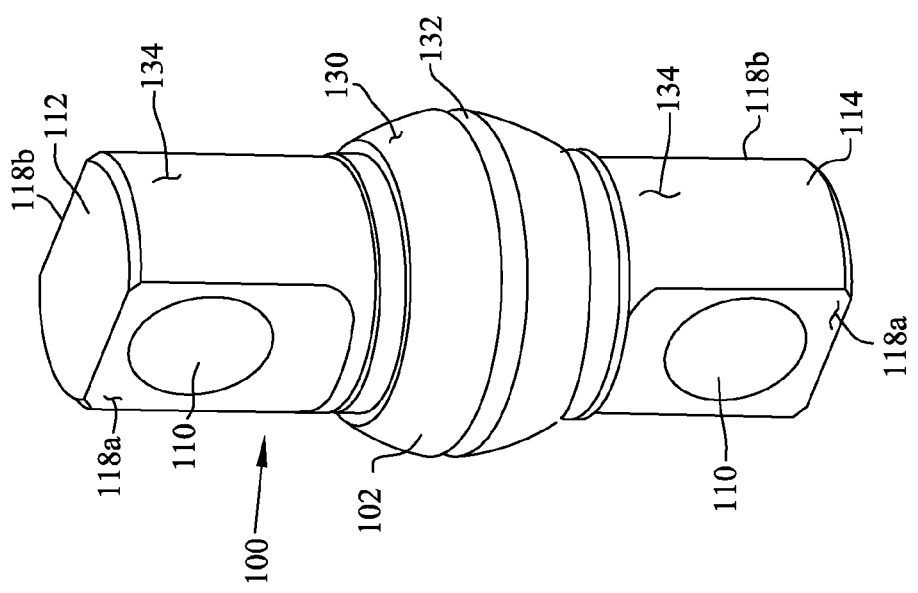

BLADE PIVOT MECHANISM

FIELD

The present disclosure relates to a blade pivot mechanism for a work vehicle, and more particularly to a blade pivot mechanism having a bushing bolt for limiting axial play.

BACKGROUND

Both wheeled and tracked work vehicles, such as a bulldozer, may include a PAT (power angle tilt) blade for pushing, shearing, carrying, and spreading dirt and other material. Hydraulic cylinders are often used to control the orientation of the blade relative to the ground. Spherical bearings coupled between the hydraulic cylinders and the blade allow for the adjustment of the angle, tilt, and pitch of the blade. However, axial play in the spherical bearing has been found to reduce the precision of the blade control. In systems utilizing integrated grade control, the axial play of the spherical bearing may cause the control system to repeatedly correct the position of the blade, resulting in increased wear on the spherical bearing, the blade, and the blade control mechanisms. Further, replacement of the spherical bearing leads to significant vehicle downtime.

SUMMARY

According to an embodiment of the present disclosure, a work vehicle is provided with a frame and a blade movably coupled to the frame with a pivot mechanism. The pivot mechanism includes a mounting bracket coupled to the blade, the mounting bracket including a first coupling member and a second coupling member. The pivot mechanism includes a shaft having a first end and a second end opposite the first end, the shaft having a substantially spherical portion axially fixedly positioned between the first and second ends, the substantially spherical portion having an outer bearing surface, the first end coupled to the first coupling member and the second end coupled to the second coupling member. The pivot mechanism further includes a bushing movably coupled to the substantially spherical portion of the shaft, the bushing having an inner bearing surface configured to cooperate with the outer bearing surface of the substantially spherical portion of the shaft to enable movement of the blade relative to the frame of the work vehicle.

According to another embodiment of the present disclosure, a work vehicle is provided including a chassis, a blade movably coupled to the chassis, and a mounting bracket coupled to the blade and having a first coupling member and a second coupling member. The work vehicle includes at least one bearing assembly coupled to the first and second coupling members of the mounting bracket. The at least one bearing assembly includes a shaft having a first end and a second end and including a substantially spherical portion fixedly positioned relative to the first and second ends, the first end being fastened to the first coupling member and the second end being fastened to the second coupling member such that the substantially spherical portion is fixedly positioned relative to the blade, and a bushing coupled to the substantially spherical portion of the shaft. The work vehicle further includes a cylinder coupled to the at least one bearing assembly and configured to provide an input to the blade to adjust the position of the blade.

According to yet another embodiment of the present disclosure, a method of mounting a blade to a chassis of a vehicle is provided, the vehicle including a cylinder coupled to the chassis for manipulating a position of the blade. The method includes the steps of providing a bearing assembly including a bushing and a shaft, the shaft having a first coupling end, a second coupling end located opposite the first coupling end, and a substantially spherical portion fixedly positioned between the first and second coupling ends that receives the bushing, coupling an end of the cylinder to the bearing assembly, and fastening the bearing assembly to the blade, the substantially spherical portion of the shaft being axially fixedly positioned relative to at least one of the blade and the cylinder.

BRIEF DESCRIPTION OF THE DRAWINGS

The above-mentioned and other features and advantages of the invention, and the manner of attaining them, will become more apparent and the disclosure itself will be better understood by reference to the following description taken in conjunction with the accompanying drawings, wherein:

FIG. 5A illustrates the bolt of the bearing assembly of FIG. 4;

FIG. 5B illustrates the bushing of the bearing assembly of FIG. 4;

FIG. 5C illustrates the seal of the bearing assembly of FIG. 4; and

Corresponding reference characters indicate corresponding parts throughout the several views. The exemplifications set out herein illustrate exemplary embodiments of the invention, and such exemplifications are not to be construed as limiting the scope of the invention in any manner.

DETAILED DESCRIPTION

The embodiments disclosed herein are not intended to be exhaustive or to limit the disclosure to the precise forms disclosed in the following detailed description. Rather, the embodiments are chosen and described so that others skilled in the art may utilize their teachings.

Figure 1:
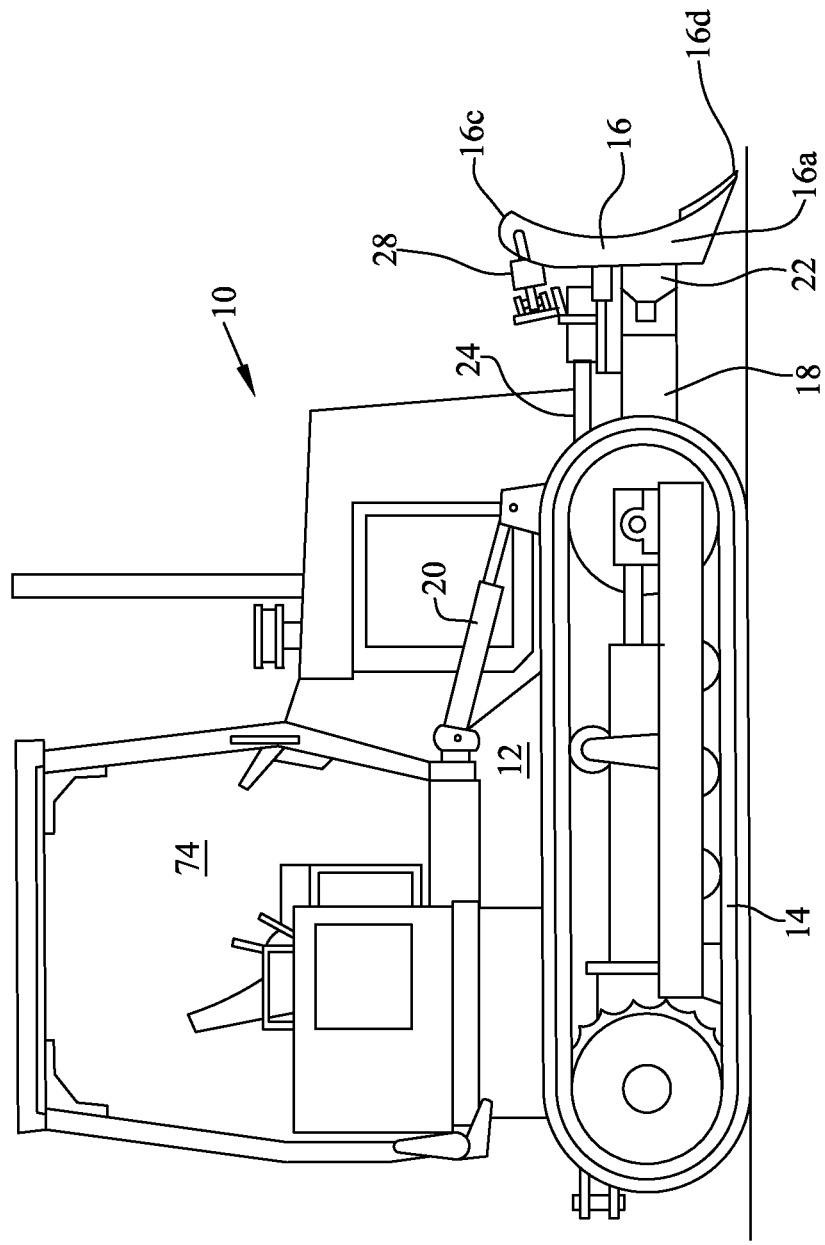
FIG. 1 illustrates an exemplary work vehicle having an adjustable blade.

Referring initially to FIG. 1, an exemplary work vehicle in the form of a bulldozer 10 is provided. Bulldozer 10 includes a chassis 12 and a ground engaging mechanism 14. Ground engaging mechanism 14 may include any device capable of supporting and propelling chassis 12. For example, ground engaging mechanism 14 may include belts, such as friction or positively driven rubber belts, or steel tracks, as illustrated in FIG. 1. Ground engaging mechanism 14 may alternatively include wheels. Bulldozer 10 includes a blade 16 forwardly mounted to chassis 12 for pushing, shearing, carrying, and spreading dirt and other material. Although the vehicle is illustrated and described herein as bulldozer 10, the vehicle may include any type of vehicle having a blade, including motor graders and other known vehicles with blades.

Bulldozer 10 is configured to raise and lower blade 16 relative to chassis 12. In the illustrated embodiment, bulldozer 10 includes a blade linkage 18 and at least one hydraulic lift cylinder 20 for raising and lowering blade 16. Hydraulic lift cylinder 20 is coupled between blade linkage 18 and chassis 12, and blade 16 is coupled to blade linkage 18. In one embodiment, blade linkage 18 is in the form of a C-frame structure that is pivotally coupled to chassis 12. In operation, as hydraulic lift cylinder 20 is extended or retracted, blade linkage 18, and blade 16 attached thereto, are raised and lowered relative to chassis 12.

Figure 2:
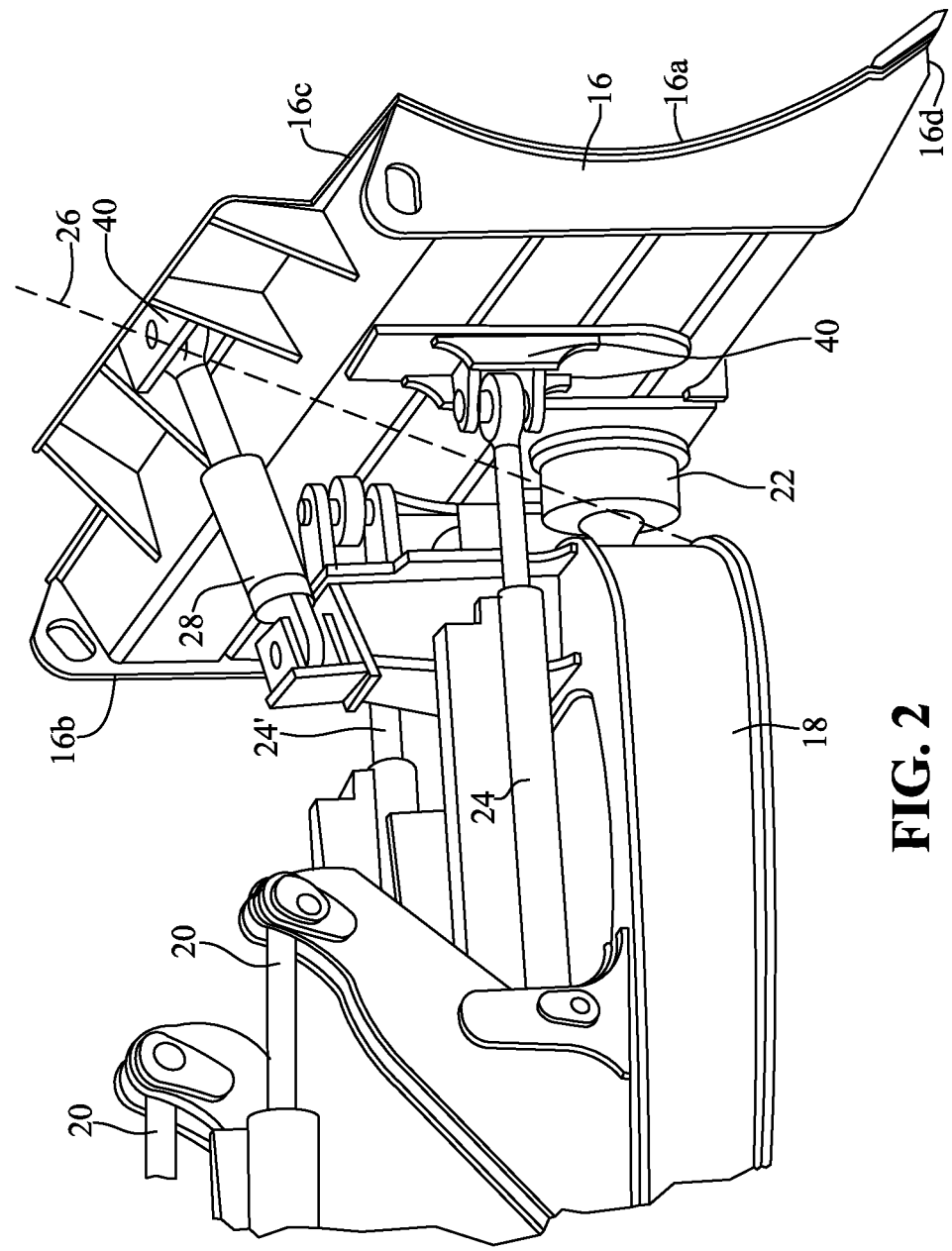
FIG. 2 illustrates the adjustable blade of the work vehicle of FIG. 1 coupled to a blade linkage.

Bulldozer 10 may also be configured to adjust the angle, pitch, and tilt of blade 16. Referring to FIG. 2, the angle of blade 16 concerns movement of one end (e.g. end 16a) of blade 16 forward, corresponding with movement of the opposite end (e.g. end 16b) of blade 16 rearward. The pitch of blade 16 involves movement of a top edge 16c of blade 16 forward and rearward with respect to a lower edge 16d of blade 16 so as to change the angle at which blade 16 intersects level ground. The tilt of blade 16 involves raising and lowering one end (e.g. end 16a) of blade 16 relative to the opposite end (e.g. end 16b) of blade 16.

As illustrated in FIGS. 1 and 2, blade 16 is coupled to blade linkage 18 by a pitch cylinder 28 for adjusting the pitch of blade 16 and angling cylinders 24 and 24' for adjusting the angle of blade 16. However, blade 16 may be coupled to blade linkage 18 by any number of cylinders configured to adjust the angle and/or pitch of blade 16. Bulldozer 10 may also include a tilt cylinder (not shown) or another suitable mechanism for adjusting the tilt of blade 16. Pitch cylinder 28 and angling cylinders 24 and 24' are illustratively coupled to blade 16 via pivot mechanisms 40 having bearing assemblies. See, for example, bearing assembly 56 of pivot mechanism 40 illustrated in FIGS. 3-6 and described herein.

A pivot joint 22 illustratively extends from blade linkage 18 and is coupled to the bottom portion of blade 16 along central axis 26. In one embodiment, pivot joint 22 is a spherical bearing. Central axis 26 is contained within a vertical plane that extends through bulldozer 10 from back to front and that divides bulldozer 10, including blade 16, into right and left halves.

Angling cylinders 24 and 24' are configured to angle blade 16 relative to blade linkage 18 about pivot joint 22. As discussed above, angling cylinders 24 and 24' are configured to move one end (e.g. 16a) of blade 16 forward, corresponding to movement of the opposite end (e.g. 16b) of blade 16 rearward. Angling cylinders 24 and 24' are illustratively double acting hydraulic cylinders, although multiple single acting hydraulic cylinders or similar devices may also be used. Both angling cylinders 24, 24' are offset from central axis 26 such that one angling cylinder 24 is coupled to blade 16 to the right of central axis 26 and the other angling cylinder 24' is coupled to blade 16 to the left of central axis 26. In operation, as one angling cylinder 24 extends, the other angling cylinder 24' retracts, and vice versa.

Pitch cylinder 28 is configured to pitch blade 16 forward and backward relative to blade linkage 18 about pivot joint 22. Pitch cylinder 28 is illustratively a double acting hydraulic cylinder, although multiple single acting hydraulic cylinders or similar devices may also be used. Hydraulic pitch cylinder 28 is located between blade 16 and blade linkage 18 and is illustratively aligned with central axis 26. In operation, hydraulic pitch cylinder 28 may control the pitch of blade 16 from top edge 16c of blade 16. More specifically, as pitch cylinder 28 extends, blade 16 pivots forward about pivot joint 22 away from chassis 12. As pitch cylinder 28 retracts, blade 16 pivots backward about pivot joint 22 toward chassis 12.

Figure 3:
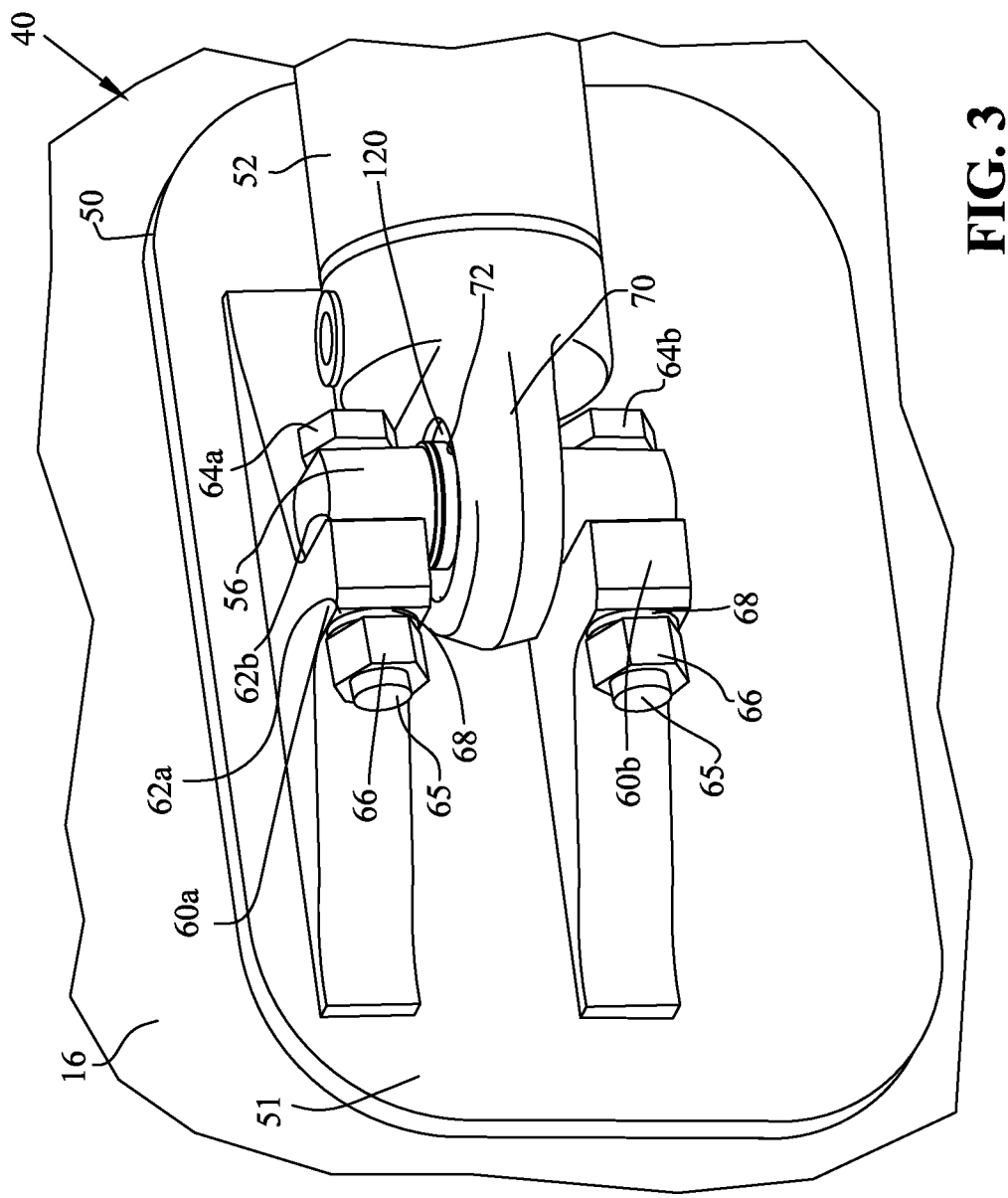
FIG. 3 illustrates an exemplary pivot mechanism for the blade of the work vehicle of FIG. 1, the pivot mechanism including a bearing assembly.

Referring to FIG. 3, an exemplary pivot mechanism 40 configured to couple blade 16 to blade linkage 18 is shown. Pivot mechanism 40 provides a pivot point for blade 16 and allows blade 16 to pivot in multiple directions without restriction relative to blade linkage 18. Pivot mechanism 40 includes a cylinder 52, a bearing assembly 56, and a mounting bracket 50, each of which is described further below.

Cylinder 52 may correspond to any of pitch cylinder 28, angling cylinders 24 and 24', and tilt cylinders, for example. Cylinder 52 is coupled to mounting bracket 50 via bearing assembly 56. In particular, cylinder 52 includes a coupling portion 70 having an inner opening 72 configured to receive bearing assembly 56.

Mounting bracket 50 includes a pair of ears or lugs 60a, 60b spaced apart from each other and extending from a back plate 51. Bearing assembly 56 is configured to fasten to lugs 60a, 60b. Lugs 60a, 60b each include an opening (not shown) extending between opposing flat surfaces 62a, 62b for receiving a fastener, such as one of fasteners 64a, 64b. In one embodiment, lugs 60a, 60b extend perpendicularly from back plate 51. In the illustrated embodiment, lugs 60a, 60b are integrally formed with back plate 51, although lugs 60a, 60b may alternatively be fastened or welded to back plate 51.

Figure 4:
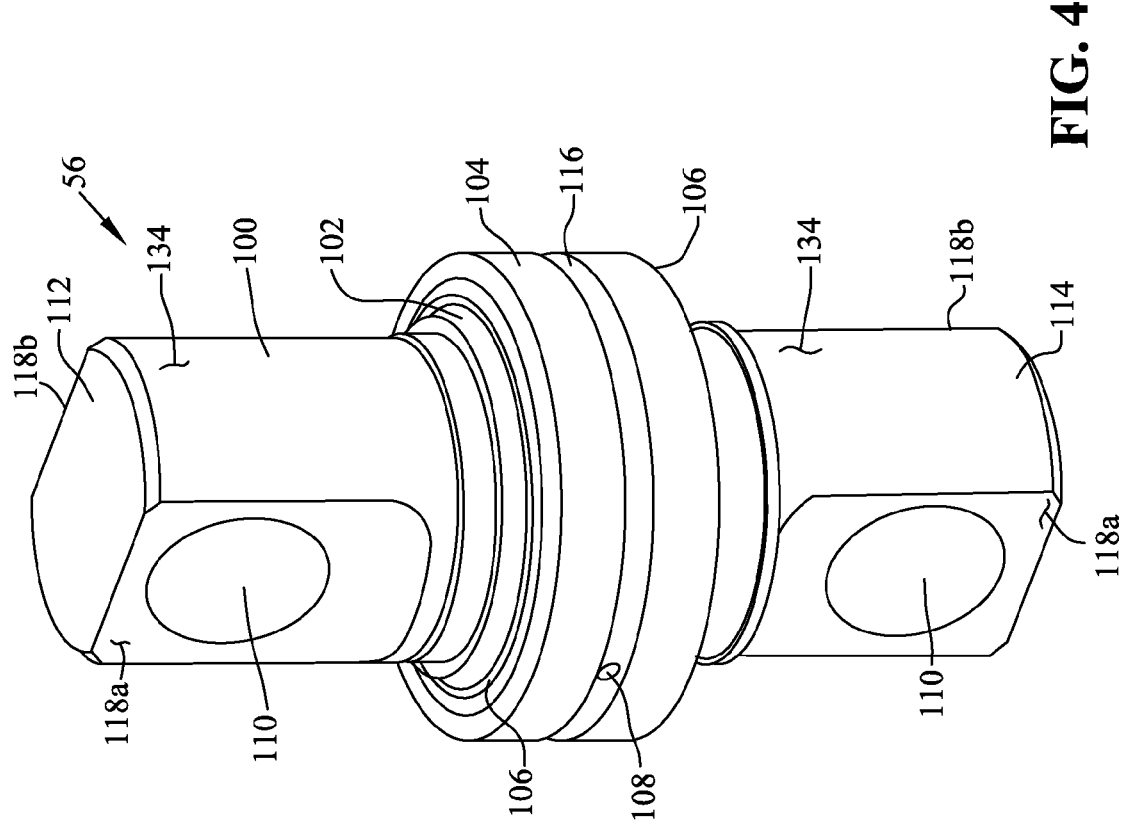
FIG. 4 illustrates the bearing assembly of the pivot mechanism of FIG. 3, the bearing assembly including a bolt, a bushing, and a seal.

As illustrated in FIG. 4, bearing assembly 56 includes a bushing bolt or shaft 100, a bushing 104, and at least one seal 106. Shaft 100 includes a first end 112 and a second end 114 located opposite first end 112. Referring to FIGS. 4 and 5A, first end 112 and second end 114 each include a curved outer surface 134 extending between opposing flat surfaces 118a, 118b. Outer surface 134 may alternatively be a flat or other suitably shaped surface. Shaft 100 further includes openings 110 formed at first and second ends 112, 114 and extending entirely through shaft 100 between flat surfaces 118a, 118b. Each of openings 110 is illustratively cylindrical in shape for receiving one of fasteners 64a, 64b.

Referring to FIG. 3, first and second ends 112, 114 of shaft 100 are coupled to lugs 60a, 60b of mounting bracket 50 via fasteners 64a, 64b. In particular, fasteners 64a, 64b are received by openings 110 of shaft 100 and by the openings in lugs 60a, 60b to couple bearing assembly 56 to mounting bracket 50. In the illustrated embodiment, fasteners 64a, 64b are each comprised of a bolt 65, a fastening nut 66, and optionally one or more washers 68. Flat surfaces 62a, 62b of lugs 60a, 60b are configured to cooperate with flat surfaces 118a, 118b of shaft 100 to prevent rotation of shaft 100 between lugs 60a, 60b. In the illustrated embodiment, the design of bearing assembly 56 is substantially symmetrical such that each flat surface 118a, 118b of each end 112, 114 of shaft 100 is configured to couple to either lug 60a, 60b. Therefore, shaft 100 may be secured to lugs 60a, 60b with end 112 oriented upward or downward. Similarly, bearing assembly 56 may be coupled against either of flat surfaces 62a, 62b of lugs 60a, 60b. Therefore, shaft 100 may be coupled against the right or left side of lugs 60a, 60b.

Referring to FIGS. 4 and 5A, shaft 100 includes a spherical portion 102 fixedly positioned between first and second ends 112 and 114. As illustrated in FIG. 5A, spherical portion 102 includes a spherical outer surface 130 and a circumferentially extending channel 132. In the illustrated embodiment, spherical portion 102 is integrally formed with shaft 100. However, spherical portion 102 may alternatively be a separate component of bearing assembly 56 that is fastened in a fixed axial position between first and second ends 112 and 114.

Bushing 104 of bearing assembly 56 is positioned onto spherical portion 102 of shaft 100. Bushing 104 is configured to move angularly and rotationally relative to spherical portion 102 while remaining fixed axially relative to spherical portion 102. Referring to FIG. 5B, bushing 104 includes an inner surface 124 that serves as a bearing surface to cooperate with spherical outer surface 130 of shaft 100. Inner surface 124 is illustratively spherical in shape. One or more holes 108 in bushing 104 allow for the lubrication of the bearing area between inner surface 124 of bushing 104 and spherical outer surface 130 of spherical portion 102 of shaft 100. In the illustrated embodiment, a plurality of grooves 126 formed within spherical inner surface 124 are configured to receive the lubricant (e.g. oil) that is inserted through holes 108 to reduce the friction between bushing 104 and spherical portion 102. Similarly, channel 132 of shaft 100 is also configured to receive the lubricant to reduce the friction between bushing 104 and spherical portion 102. Bushing 104 further includes a circumferential channel 116. In one embodiment, channel 116 engages an inner ridge of coupling portion 70 of cylinder 52 (FIG. 3).

In one embodiment, bushing 104 and shaft 100 are comprised of a steel material, although other suitable materials may be used. An exemplary bearing assembly 56 is Model No. BLR-0243-2LS available from SKF USA Inc. located in Lansdale, Pa.

A circumferential seat 122 is illustratively formed at each end of bushing 104 for receiving a seal 106. Seal 106, illustrated in FIG. 5C, is configured to contain the lubricant located between bushing 104 and spherical portion 102 and to reduce the likelihood of dust and other debris reaching the bearing area. Seal 106 illustratively includes a circumferential ridge 128 configured to engage seat 122 of bushing 104 for coupling seal 106 to bushing 104. In the illustrated embodiment, bearing assembly 56 includes two seals 106, one at either end of bushing 104.

Referring again to FIG. 3, inner opening 72 of cylinder 52 is sized to receive bushing 104 of bearing assembly 56. In one embodiment, channel 116 of bushing 104 serves to align bushing 104 with a ridge (not shown) in inner opening 72 of coupling portion 70. In the illustrated embodiment, bushing 104 is fixedly positioned within inner opening 72 of cylinder 52. A snap ring 120 is positioned within inner opening 72 adjacent to bushing 104 and seal 106 of bearing assembly 56. In one embodiment, snap ring 120 is substantially c-shaped. Snap ring 120 may be deformed or compressed to fit within inner opening 72. In one embodiment, upon insertion into inner opening 72, snap ring 120 expands into engagement with an inner groove (not shown) of coupling portion 70 of cylinder 52 to hold snap ring 120 against bushing 104. In the illustrated embodiment, snap ring 120 serves to hold seal 106 against bushing 104 within coupling portion 70 while also providing a redundant seal around the circumference of bushing 104. In one embodiment, snap ring 120 further facilitates securing bushing 104 to coupling portion 70. In the illustrated embodiment, two snap rings 120 are provided, one at either end of bushing 104 within opening 72.

When assembled via bearing assembly 56, blade 16 is configured to move angularly and rotationally relative to linkage 18 while remaining fixed axially relative to linkage 18.

Figure 6:
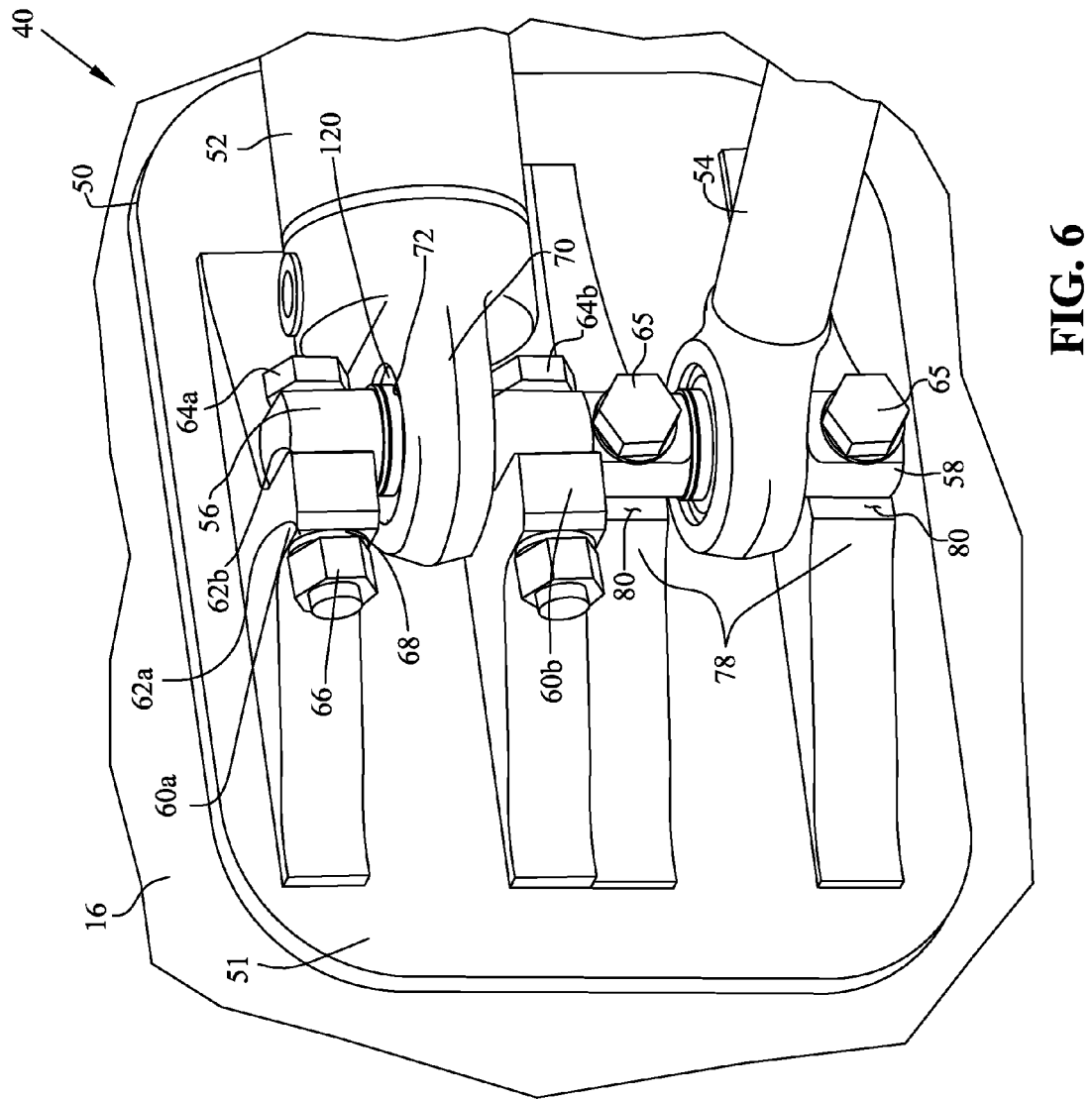
FIG. 6 illustrates another exemplary pivot mechanism for the blade of the work vehicle of FIG. 1.

Mounting bracket 50 may be configured to hold multiple cylinders for controlling blade 16, as illustrated in FIG. 6. Referring to FIG. 6, pivot mechanism 40 includes a second cylinder 54 coupled to mounting bracket 50. Each of cylinders 52 and 54 may provide for different movement of blade 16. For example, second cylinder 54 may provide angling motion for blade 16, while cylinder 52 may provide tilting motion for blade 16. Cylinders 52 and 54 may provide other blade movement combinations including pitching motion for blade 16.

In the exemplary embodiment of FIG. 6, mounting bracket 50 includes a pair of lugs 78 each having a flat surface 80 that is substantially parallel to mounting plate 51. A bearing assembly 58, illustratively having the same design as bearing assembly 56 of FIGS. 3-5C, is fastened against flat surfaces 80 of lugs 78 via fasteners 65. In one embodiment, fasteners 65 each include a bolt that protrudes through blade 16 and that receives a fastening nut on the opposite side of blade 16. Other suitable fasteners 65 may be provided for coupling bearing assembly 56 to lugs 78.

In one embodiment, pivot mechanism 40 is utilized on a work vehicle equipped with integrated grade control. Integrated grade control controls the position of a blade automatically by monitoring its position using global positioning system (GPS) technology. In one embodiment, blade 16 may be configured to have six-way action control, including control of the angle, tilt, pitch, raise/lower, forward/backward, and side-to-side movement.

Bearing assembly 56 and mounting bracket 50 of pivot mechanism 40 may be utilized to provide a pivoting mechanism in other applications. Bearing assembly 56 and mounting bracket 50 may be used with any vehicle implement or work tool that is movable (e.g. raise, angle, tilt, pitch, etc.) relative to the chassis of the vehicle. For example, bearing assembly 56 and mounting bracket 50 may be used on a production truck having a pivoting bed or on a loader having a pivoting bucket.

While this invention has been described as having preferred designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this disclosure pertains and which fall within the limits of the appended claims.

The invention claimed is:

1. A work vehicle with a frame and a blade movably coupled to the frame with a pivot mechanism, the pivot mechanism including:
   a mounting bracket coupled to the blade, the mounting bracket including a first coupling member and a second coupling member;
   a shaft having a first end and a second end opposite the first end, the first and second ends positioned along a longitudinal axis of the shaft, the shaft having a substantially spherical portion axially fixedly positioned between the first and second ends, and the substantially spherical portion having an outer bearing surface, the first coupling member of the mounting bracket having a first opening extending in a direction normal to the longitudinal axis of the shaft and the first end of the shaft being coupled to the first coupling member, and the second coupling member of the mounting bracket having a second opening extending in a direction normal to the longitudinal axis and the second end of the shaft being coupled to the second coupling member;
   a first fastener received through the first end of the shaft and the first coupling member, wherein the first fastener extends in a direction normal to the longitudinal axis of the shaft and parallel to the first opening in the first coupling member;
   a second fastener received through the second end of the shaft and the second coupling member, wherein the second fastener extends in a direction normal to the longitudinal axis of the shaft and parallel to the second opening in the second coupling member; and
   a bushing movably coupled to the substantially spherical portion of the shaft, the bushing having an inner bearing surface configured to cooperate with the outer bearing surface of the substantially spherical portion of the shaft to enable movement of the blade relative to the frame of the work vehicle.

2. The work vehicle of claim 1, wherein the first end and the second end of the shaft are each configured to mount to either of the first and second coupling members.

3. The work vehicle of claim 2, wherein the first and second ends of the shaft each include a substantially flat surface configured to engage a corresponding substantially flat surface of one of the first and second coupling members of the mounting bracket.

4. The work vehicle of claim 3, wherein the mounting bracket includes a mounting plate fixedly coupled to the blade, each of the first and second coupling members protruding outwardly from the mounting plate to define the first and second openings for receiving one of the first and second fasteners.

5. The work vehicle of claim 4, wherein each substantially flat surface of the first and second coupling members is substantially parallel to the mounting plate, each of the first and second fasteners extending through the blade.

6. The work vehicle of claim 4, wherein each substantially flat surface of the first and second coupling members is substantially perpendicular to the mounting plate.

7. The work vehicle of claim 1, wherein the bushing is configured to move rotationally and angularly relative to the substantially spherical portion of the shaft.

8. The work vehicle of claim 7, wherein engagement of the inner bearing surface of the bushing with the outer bearing surface of the substantially spherical portion of the shaft substantially limits axial movement of the bushing relative to the shaft.

9. The work vehicle of claim 1, further comprising a hydraulic cylinder coupled to the bushing and configured to provide an input to the blade to adjust a position of the blade, the hydraulic cylinder including a coupling portion having an inner surface forming an opening for receiving the bushing.

10. The work vehicle of claim 9, wherein an outer surface of the bushing includes a circumferential channel configured to engage a ridge of the inner surface of the cylinder.

11. The work vehicle of claim 9, further comprising a circumferential seal coupled to at least one end of the bushing and configured to seal a lubricant located between the bushing and the substantially spherical portion.

12. The work vehicle of claim 11, further comprising a snap ring positioned adjacent to the seal within the opening of the coupling portion of the hydraulic cylinder and configured to hold the seal within the coupling portion of the hydraulic cylinder.

13. The work vehicle of claim 11, wherein the bushing includes a lubrication hole extending from the inner bearing surface to the outer surface of the bushing, the inner bearing surface of the bushing including a plurality of grooves configured to receive the lubricant injected through the lubrication hole.

14. The work vehicle of claim 1, wherein the first and second ends of the shaft are integral with the spherical portion of the shaft.

15. The work vehicle of claim 1, wherein the first opening of the first coupling member simultaneously receives the first end of the shaft as the second opening of the second coupling member receives the second end of the shaft.

16. The work vehicle of claim 1, wherein the first and second fasteners inhibit movement of the shaft relative to the mounting bracket.

* * * * *